United States Patent
Chen

(10) Patent No.: US 7,195,384 B2
(45) Date of Patent: Mar. 27, 2007

(54) ADJUSTING DEVICE FOR HEAD LIGHT SYSTEM

(75) Inventor: Wei-Jen Chen, Tainan (TW)

(73) Assignee: TYC Brother Industrial Co., Ltd., Tainan (TW)

( * ) Notice: Subject to any disclaimer, the term of this patent is extended or adjusted under 35 U.S.C. 154(b) by 77 days.

(21) Appl. No.: 11/079,231

(22) Filed: Mar. 15, 2005

(65) Prior Publication Data

US 2006/0209554 A1 Sep. 21, 2006

(51) Int. Cl.
*F21V 17/02* (2006.01)
*F21V 19/02* (2006.01)
*B60Q 1/00* (2006.01)
*F16H 3/06* (2006.01)

(52) U.S. Cl. .................. 362/512; 362/464; 362/465; 362/523; 362/528; 74/89.23

(58) Field of Classification Search ............. 362/512, 362/464, 465, 467, 468, 523, 528; 74/89.23, 74/89.34, 424.71
See application file for complete search history.

(56) References Cited

U.S. PATENT DOCUMENTS

| 3,727,472 | A  | * | 4/1973  | Maekawa ............... 74/89.35 |
| 6,247,834 | B1 | * | 6/2001  | Suehiro ................. 362/463 |
| 6,641,292 | B2 | * | 11/2003 | Miki et al. ............. 362/513 |
| 6,979,109 | B2 | * | 12/2005 | Burton .................. 362/460 |
| 2005/0088852 | A1 | * | 4/2005 | Aguinaga ............... 362/524 |

* cited by examiner

*Primary Examiner*—Renee Luebke
*Assistant Examiner*—Evan Dzierzynski
(74) *Attorney, Agent, or Firm*—Rosenberg, Klein & Lee

(57) ABSTRACT

An adjusting device for head light assembly includes a motor fixed to a frame and the output shaft of the motor extends through a guiding passage in the frame and connected to a driving rod which includes outer threaded periphery. An activation rod has a spherical head at a first end thereof so as to be connected to an adjusting member of the light bulb and a hole with an inner threaded periphery is defined axially in a second end of the activation rod. The outer threaded periphery of the driving rod is rotatably engaged with the inner threaded periphery of the activation rod so that when the output shaft rotates, the driving rod is co-rotated so as to move the activation rod away from or close to the frame.

5 Claims, 6 Drawing Sheets

ADJUSTING DEVICE FOR HEAD LIGHT SYSTEM

FIELD OF THE INVENTION

The present invention relates to an adjusting device for a stably moving the activating rod linearly so as to adjust the light to obtain different illuminating positions of the head light.

BACKGROUND OF THE INVENTION

A conventional head light assembly of vehicles generally includes a reflector with suitable curvature and two light bulbs are located at pre-set positions so as to provide high and low beam. The head light assembly is a fixed structure and the positions of the light bulbs cannot be adjusted so that the high beam and the low beam are not adjustable. This conventional head light assembly includes an inherent shortcoming which is that the light beam is always set to illuminate the area in front of the vehicle, so that when the vehicles are located on a downward hill (for example), the body of the vehicle is orientated downward and the head light assembly fixed to the body of vehicle illuminates the area that is not the direction that the driver needs to see. The driver want to see the road conditions ahead of a larger area, but the head light assembly can only provide an illumination for a limited area because the inclination of the vehicle body. This could lead to a dangerous result.

The present invention intends to provide an adjusting device which can be operated electrically or manually and moves the light in a desired direction.

SUMMARY OF THE INVENTION

The present invention relates to an adjusting device for head light assembly and the device comprises an activation rod having a spherical head at a first end thereof to be connected with an adjusting member of the light bulb and a hole with an inner threaded periphery is defined axially in a second end of the activation rod. A frame fixed to a vehicle body has a guiding passage defined therethrough and the second end of the activation rod is movably inserted in the guiding passage. A motor fixed to the frame has an output shaft which is fixed to a driving rod in the guiding passage of the frame. The driving rod has an outer threaded periphery so as to be rotatably engaged with the inner threaded periphery of the activation rod. By activating the motor, the activation rod moves linearly by the engagement of the outer threaded periphery of the driving rod and the inner threaded periphery of the activation rod.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
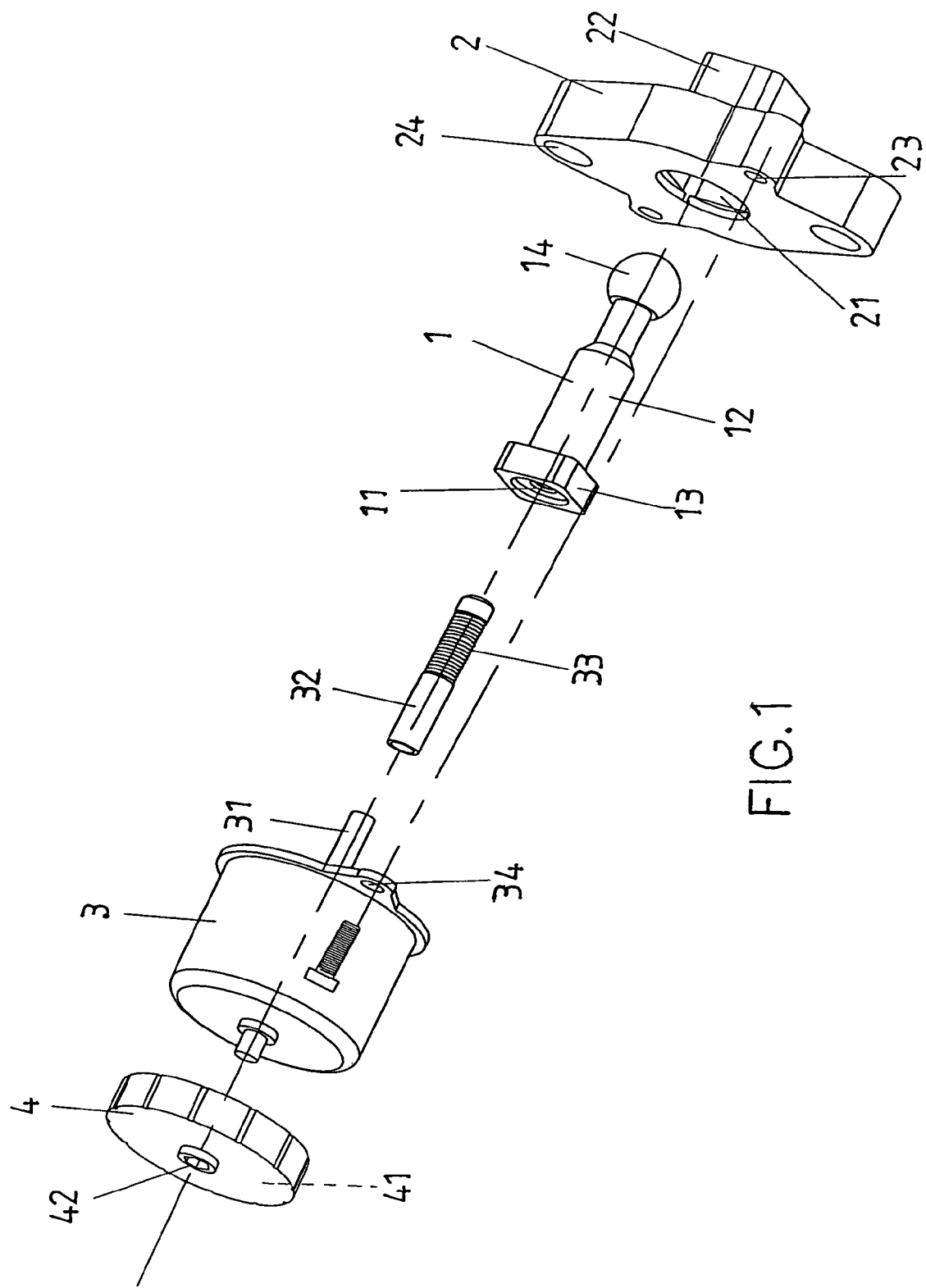
FIG. 1 is an exploded view to show the adjusting device of the present invention.
Figure 2:
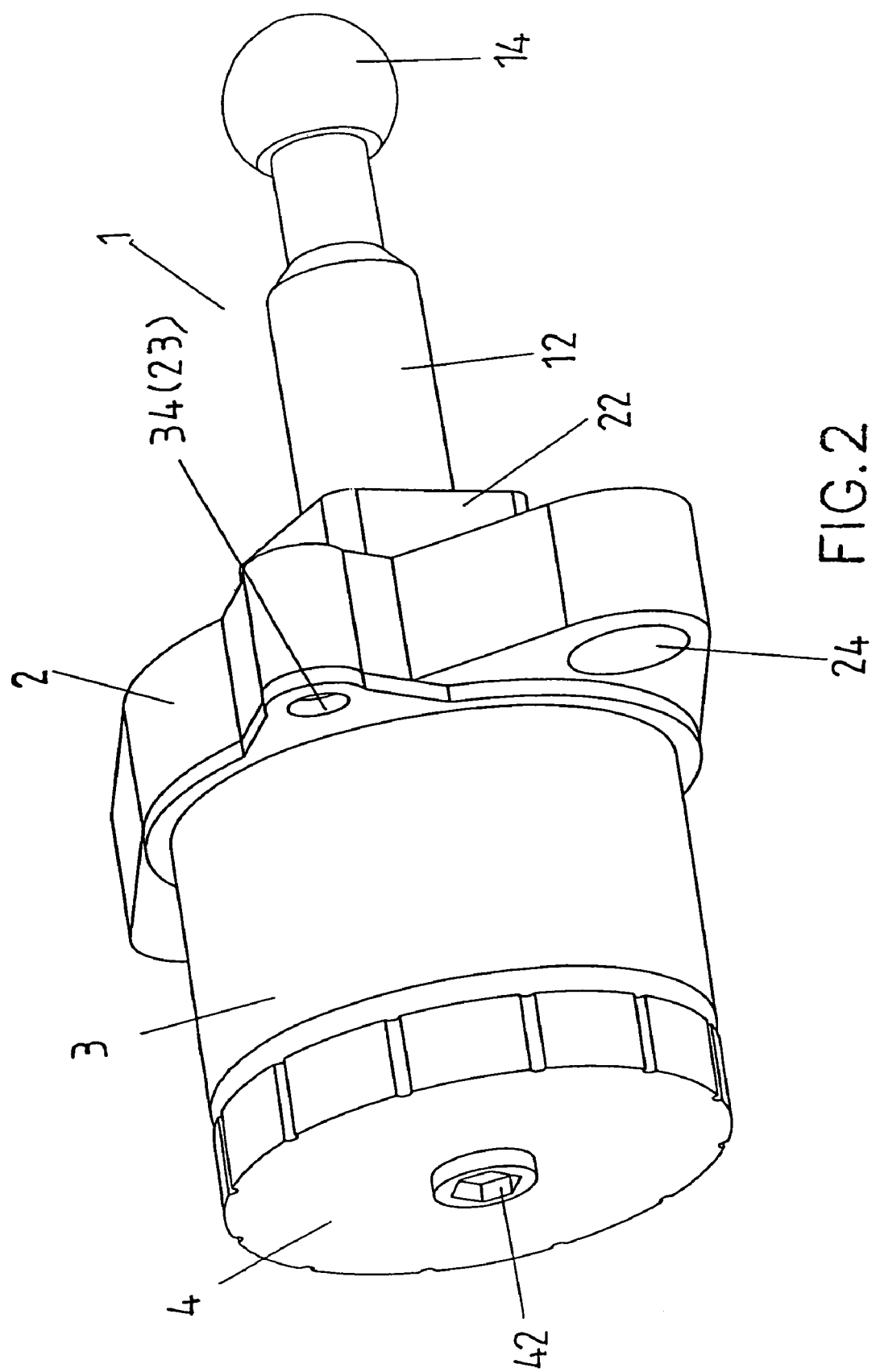
FIG. 2 is a perspective view to show the adjusting device of the present invention wherein an adjusting ring is connected thereto.
Figure 4:
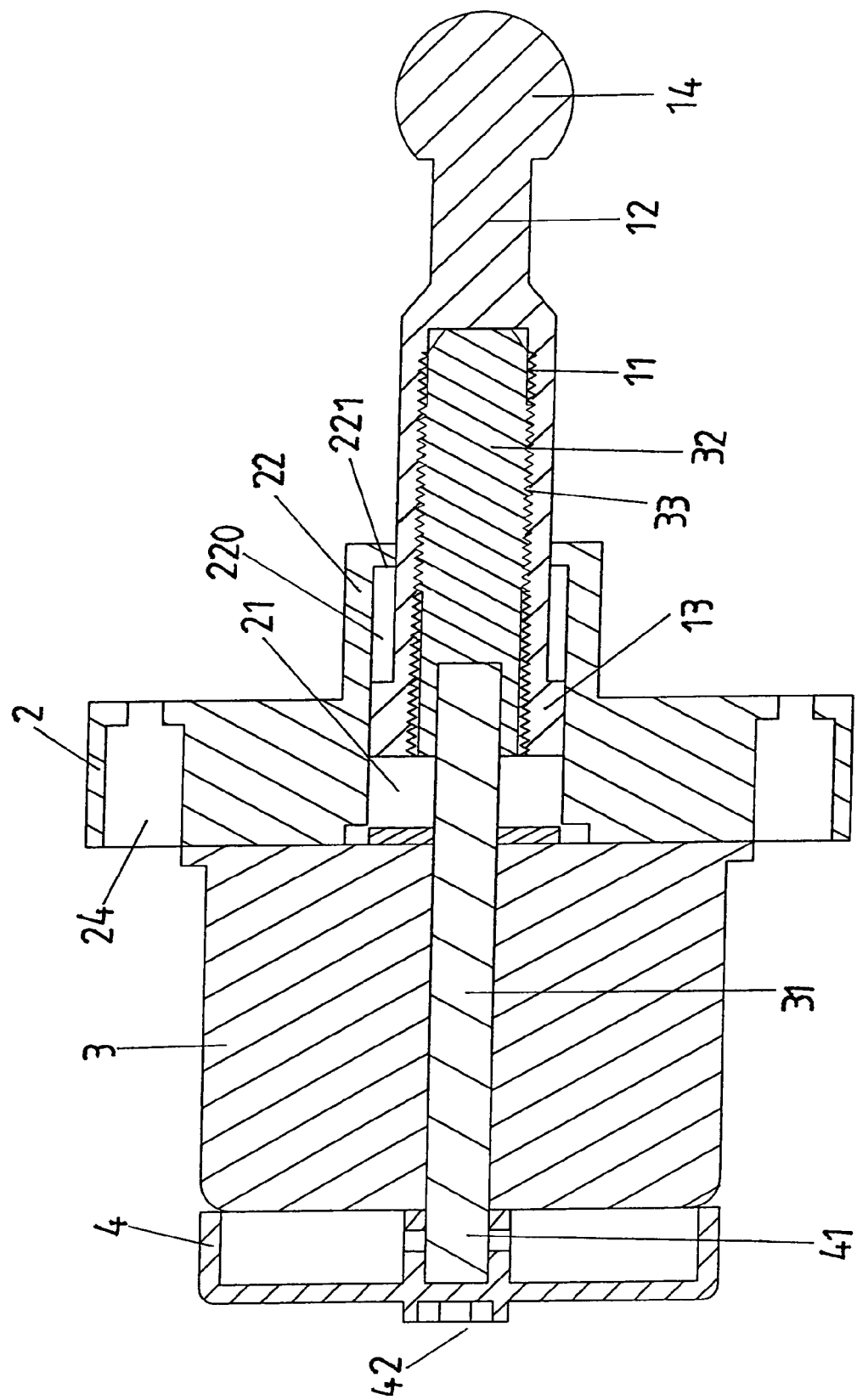
FIG. 4 shows a cross sectional view of the adjusting device of the present invention.

Referring to FIGS. 1, 2 and 4, the adjusting device for head light assembly of the present invention comprises an activation rod 1 which is a tubular rod 12 with a spherical head 14 at a first end thereof so as to be connected to an adjusting member of light bulb (not shown), and a hole with an inner threaded periphery 11 is defined axially in a second end of the activation rod 1. A rectangular flange 13 extends radially outward from the second end of the activation rod 1. A frame 2 includes two holes 24 so as to secure the frame 2 to vehicle body and a guiding passage 21 is defined through the frame 2. A rectangular protrusion 22 extends from one side of the frame 2 and an opening 220 is defined in the rectangular protrusion 22. The opening 220 communicates with the guiding passage 21. When assembling, the first end of the activation rod 1 is inserted into the guiding passage 21 and through the opening 220, such that the second end together with the rectangular flange 13 of the activation rod 1. is movably engaged with the opening 220 of the rectangular protrusion 22. A stop flange 221 extends inward from a periphery of the opening 220 of the rectangular protrusion 22 so as to prevent the rectangular flange 13 of the activation rod 1 from dropping out from the opening 220.

A motor 3 is fixed to the frame 2 by extending bolts through two holes 34 defined through the flanges extending from the motor 3 and connected with the connection holes 23 in the frame 2. An output shaft 31 extends from a first end and a second end of the motor 3.

A driving rod 32 has a first end extending through the guiding passage 21 of the frame 2 and is fixed to the output shaft 31 on the first end of the motor 3. The driving rod 32 has an outer threaded periphery 33 which is rotatably engaged with the inner threaded periphery 11 of the activation rod 1. An adjusting ring 4 has an engaging hole 41 defined therethrough so as to be securely mounted to the output shaft 31 on the second end of the motor 3. A neck portion extends from the adjusting ring 4 and encloses the engaging hole 41, the neck portion includes a polygonal inner periphery 42.

Figure 3:
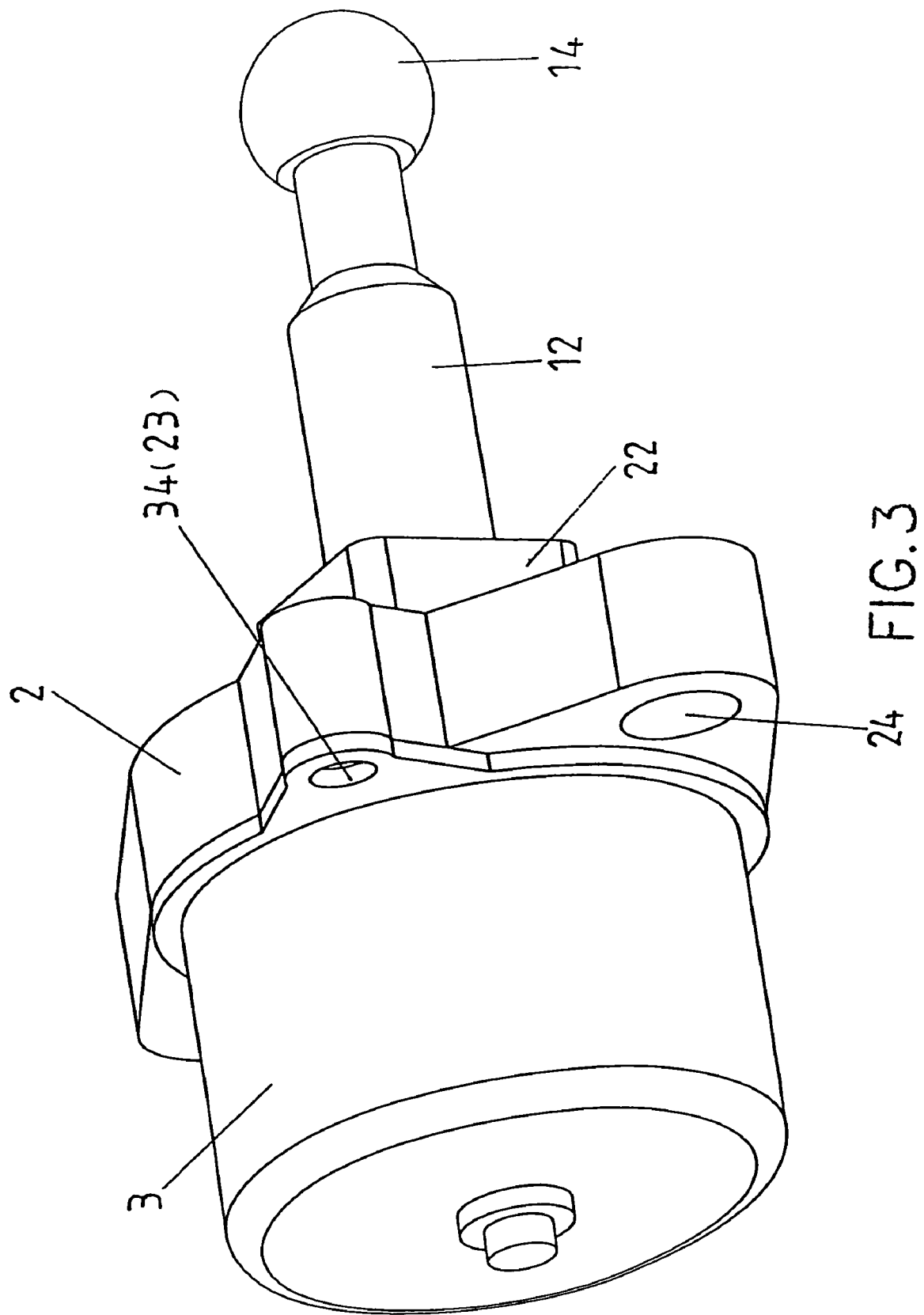
FIG. 3 is a perspective view to show the adjusting device of the present invention without the adjusting ring.

When the motor 3 is activated, the driving rod 32 is rotated by the rotation of the output shaft 31 and the activation rod 1 is moved linearly by the engagement of the outer threaded periphery 33 of the driving rod 32 and the inner threaded periphery 11 of the activation rod 1. By this way, the position of the light bulb can be adjusted. The adjustment can also be made by manual way, the user may rotate the adjusting ring 4 by hand to rotate the output shaft 31, or by engaging a tool (not shown) with the polygonal inner periphery 42 to achieve the same adjustment purposes. As shown in FIG. 3, the device can be duly operated by electric power without the adjusting ring 4.

Figure 5:
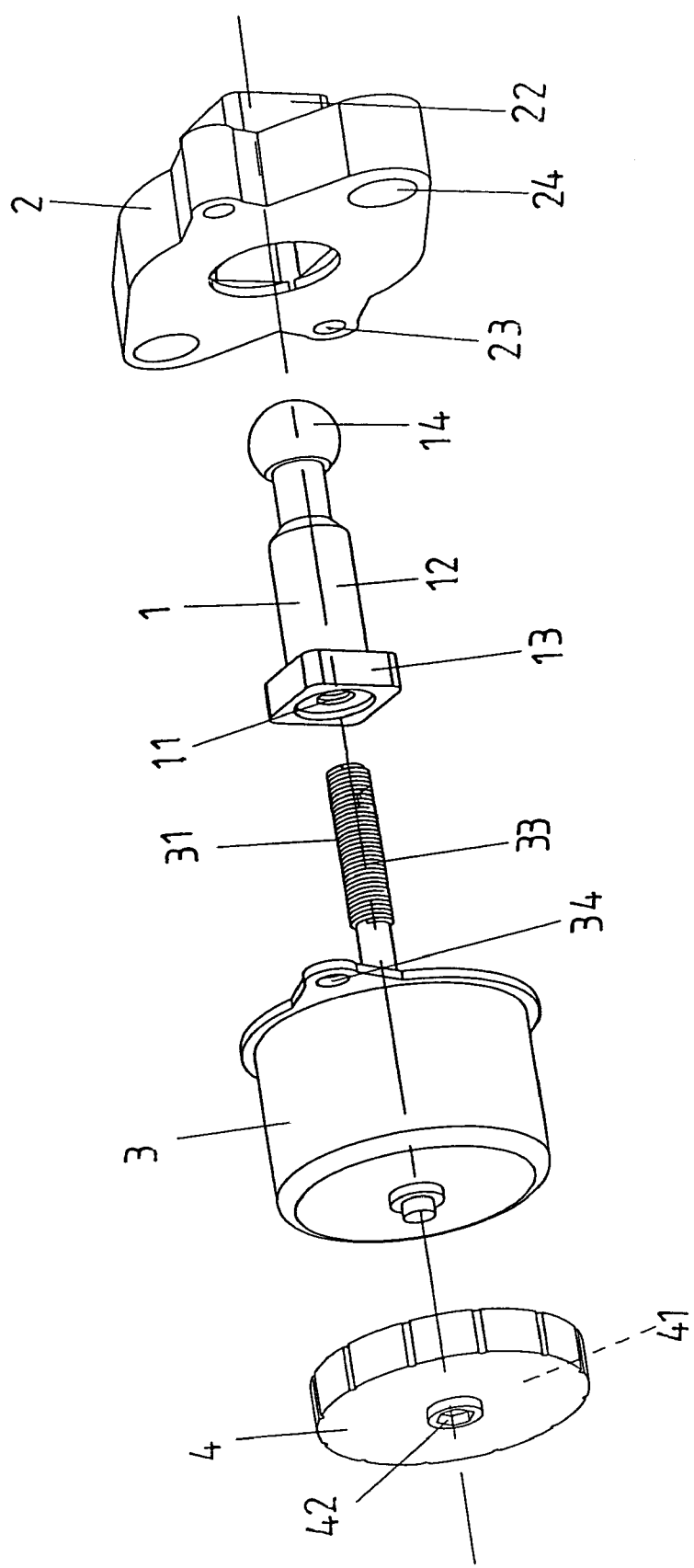
FIG. 5 is an exploded view to show another embodiment of the adjusting device of the present invention.
Figure 6:
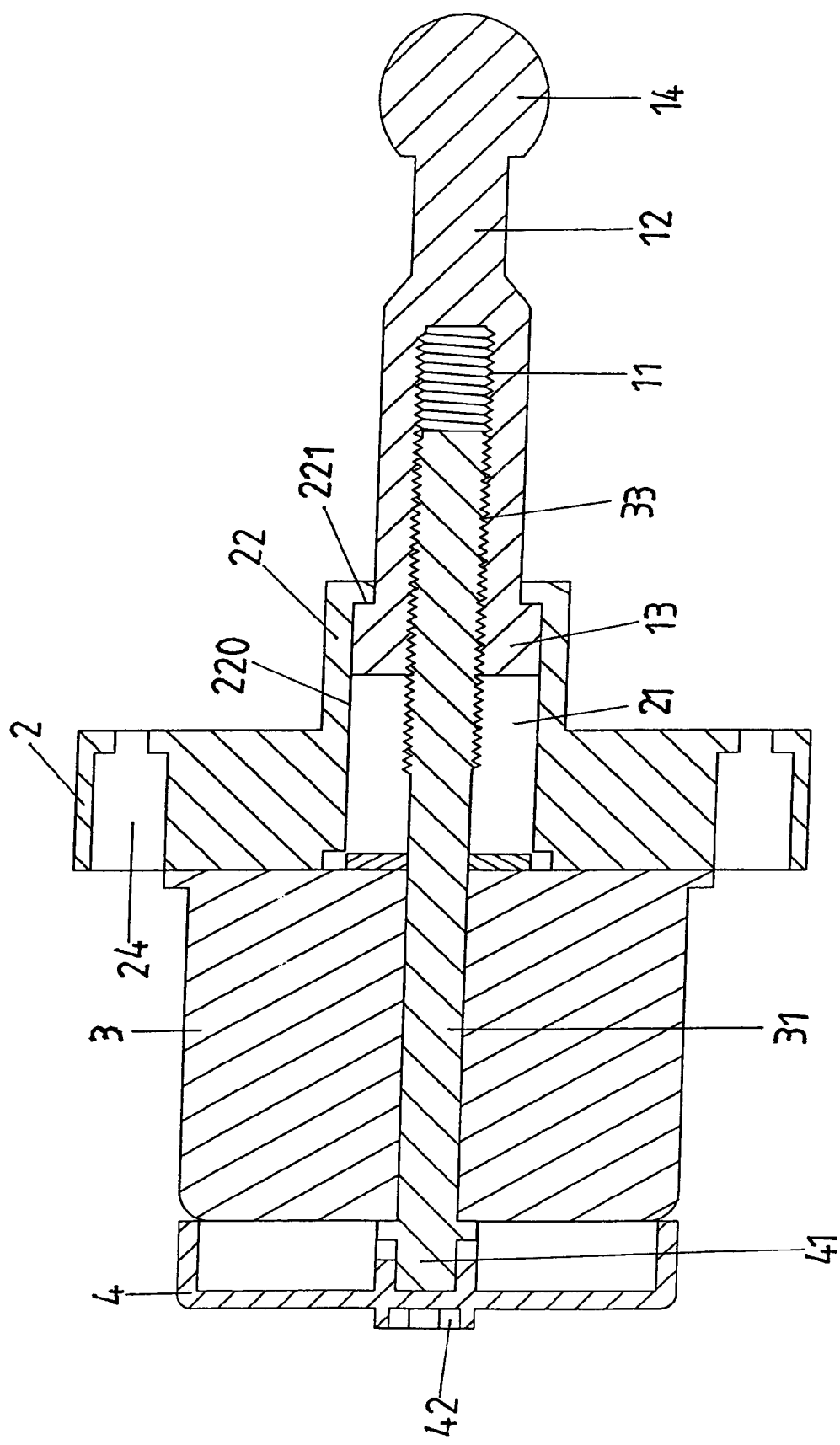
FIG. 6 shows a cross sectional view of the adjusting device of the present invention as disclosed in FIG. 5.

FIGS. 5 and 6 show another embodiment of the adjusting device of the present invention, wherein the driving rod 32 is integrally connected with the output shaft 31 on the first end of the motor 3. That is to say, the output shaft 31 includes an outer threaded periphery 33' which is engaged with the inner threaded periphery 11 of the activation rod 1.

While we have shown and described the embodiment in accordance with the present invention, it should be clear to those skilled in the art that further embodiments may be made without departing from the scope of the present invention.

What is claimed is:

1. An adjusting device for head light assembly, comprising:

an activation rod having a spherical head at a first end thereof and a hole with an inner threaded periphery defined axially in a second end of the activation rod, a rectangular flange extending radially outward from the second end of the activation rod;

a frame having a guiding passage defined therethrough and adapted to be fixed to a vehicle body, the second end of the activation rod movably inserted in the guiding passage, the frame having a rectangular protrusion extending from one side thereof and an opening defined in the rectangular protrusion, the opening communicating with the guiding passage, the rectangular flange movably engaged with the opening of the rectangular protrusion, a stop flange extending inward from a periphery of the opening of the rectangular protrusion so as to prevent the rectangular flange of the activation rod from dropping out from the opening;

a motor fixed to the frame and having an output shaft extending from a first end thereof, and a driving rod having a first end extending through the guiding passage of the frame and being fixed to the output shaft of the motor, the driving rod having an outer threaded periphery which is rotatably engaged with the inner threaded periphery of the activation rod.

2. The device as claimed in claim 1, wherein the output shaft has one end extending from a second end of the motor and an adjusting ring is securely mounted to the output shaft on the second end of the motor.

3. The device as claimed in claim 1, wherein two flanges extend from the motor and each flange has a hole, the frame includes two connection holes so that the motor is fixed to the frame by extending bolts through the holes of the flanges and connected with the connection holes in the frame.

4. The device as claimed in claim 1, wherein the driving rod is integrally connected with the output shaft on the first end of the motor.

5. The device as claimed in claim 2, wherein the adjusting ring has an engaging hole defined therethrough so as to be securely mounted to the output shaft on the second end of the motor, a neck portion extends from the adjusting ring and encloses the engaging hole, the neck portion includes a polygonal inner periphery.

* * * * *